United States Patent
Bohm et al.

(10) Patent No.: US 11,453,595 B2
(45) Date of Patent: Sep. 27, 2022

(54) PRE-TREATMENT COATING COMPOSITION AND A METHOD FOR PRODUCING THE SAME

(71) Applicant: Talga Advanced Materials GmbH, Munich (DE)

(72) Inventors: Sivasambu Bohm, Godmanchester (GB); Karanveer Singh Aneja, Mumbai (IN)

(73) Assignee: Talga Advanced Materials GmbH, Munich (DE)

( * ) Notice: Subject to any disclaimer, the term of this patent is extended or adjusted under 35 U.S.C. 154(b) by 604 days.

(21) Appl. No.: 16/320,835

(22) PCT Filed: Jul. 26, 2017

(86) PCT No.: PCT/EP2017/068924
§ 371 (c)(1),
(2) Date: Jan. 25, 2019

(87) PCT Pub. No.: WO2018/019905
PCT Pub. Date: Feb. 1, 2018

(65) Prior Publication Data
US 2019/0161354 A1    May 30, 2019

(30) Foreign Application Priority Data
Jul. 27, 2016 (GB) .................... 1612960

(51) Int. Cl.
*C01B 32/225* (2017.01)
*C01B 32/19* (2017.01)
(Continued)

(52) U.S. Cl.
CPC ............ *C01B 32/225* (2017.08); *B32B 15/16* (2013.01); *C01B 32/182* (2017.08); *C01B 32/19* (2017.08);
(Continued)

(58) Field of Classification Search
CPC ... C01B 32/225; C01B 32/182; C01B 32/205; C01B 32/20; C01B 32/19; C01B 32/194;
(Continued)

(56) References Cited

U.S. PATENT DOCUMENTS

2011/0200825 A1  8/2011  Chakraborty et al.
2014/0027299 A1* 1/2014  Loh .................. B82Y 30/00
                                                205/338

FOREIGN PATENT DOCUMENTS

CN      102351174        2/2012
CN      105540575 A  *   5/2016
(Continued)

OTHER PUBLICATIONS

Garcia-Hernandez, Mar, and Jonathan Coleman. "Materials science of graphene: a flagship perspective." 2D Materials 3.1 (2016): 010401.*
(Continued)

*Primary Examiner* — Richard M Rump
(74) *Attorney, Agent, or Firm* — Burns & Levinson, LLP; Janine M. Susan.

(57) ABSTRACT

The invention relates to a method for producing a pre-treatment coating composition for a metal substrate, the method comprising the steps of: i. mining graphite ore from a graphite ore body; ii. subjecting the graphite ore to an electrolytic treatment to obtain an expanded graphitic material; iii. subjecting the expanded graphitic material to an exfoliation treatment to obtain single-layer graphene and few-layer graphene, and iv. functionalising the graphene with a coupling agent for coupling graphene to the metal substrate.

12 Claims, 1 Drawing Sheet

Figure 1:
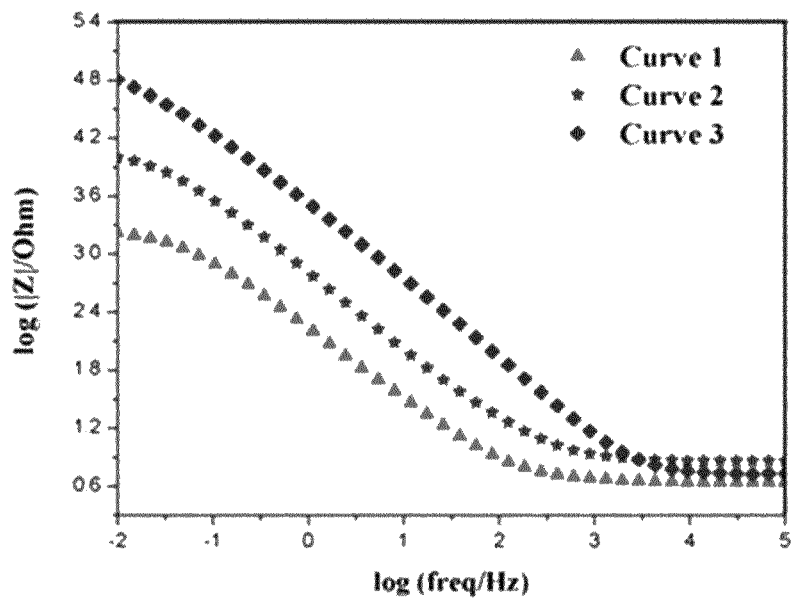

(51) Int. Cl.

| | | |
|---|---|---|
| *C01B 32/194* | (2017.01) | |
| *C09D 7/61* | (2018.01) | |
| *C09D 5/08* | (2006.01) | |
| *B32B 15/16* | (2006.01) | |
| *C25B 1/00* | (2021.01) | |
| *C09D 7/40* | (2018.01) | |
| *C01B 32/182* | (2017.01) | |
| *C01B 32/205* | (2017.01) | |
| *C01B 32/20* | (2017.01) | |
| *C08K 3/04* | (2006.01) | |
| *C01B 32/215* | (2017.01) | |
| *C23C 20/06* | (2006.01) | |

(52) U.S. Cl.
CPC ............ *C01B 32/194* (2017.08); *C01B 32/20* (2017.08); *C01B 32/205* (2017.08); *C09D 5/08* (2013.01); *C09D 5/084* (2013.01); *C09D 7/61* (2018.01); *C09D 7/70* (2018.01); *C25B 1/00* (2013.01); *C01B 32/215* (2017.08); *C01B 2204/04* (2013.01); *C01P 2004/24* (2013.01); *C08K 3/042* (2017.05); *C23C 20/06* (2013.01)

(58) Field of Classification Search
CPC ..... C01B 32/215; C01B 2204/04; C09D 7/61; C09D 5/084; C09D 7/70; C09D 5/08; B32B 15/16; C25B 1/00; C25B 1/135; C08K 3/042; C01P 2004/24; C23C 20/06
See application file for complete search history.

(56) References Cited

FOREIGN PATENT DOCUMENTS

| CN | 105731442 | 7/2016 |
| GB | 2516919 | 2/2015 |
| GB | 2520496 | 5/2015 |
| WO | 2015/074752 | 5/2015 |
| WO | 2015/160764 | 10/2015 |

OTHER PUBLICATIONS

Mo, Mengting, et al. "Excellent tribological and anti-corrosion performance of polyurethane composite coatings reinforced with functionalized graphene and graphene oxide nanosheets." Rsc Advances 5.70 (2015): 56486-56497.*

Shang, Jingqi, Feng Xue, and Enyong Ding. "The facile fabrication of few-layer graphene and graphite nanosheets by high pressure homogenization." Chemical Communications 51.87 (2015): 15811-15814.*

Du, Wencheng, Xiaoqing Jiang, and Lihua Zhu. "From graphite to graphene: direct liquid-phase exfoliation of graphite to produce single-and few-layered pristine graphene." Journal of Materials Chemistry A 1.36 (2013): 10592-10606.*

Khaled Parvez et al.; Journal of the American Chemical Society; vol. 136, No. 16; Exfoliation of Graphite into Graphene in Aqueous Solutions of Inorganic Salts; Apr. 23, 2014; 10 pages.

International Search Report and Written Opinion of International Patent Application No. PCT/EP2017/068924; dated Dec. 15, 2017; 13 pages.

* cited by examiner

PRE-TREATMENT COATING COMPOSITION AND A METHOD FOR PRODUCING THE SAME

CROSS-REFERENCE TO RELATED APPLICATIONS

This application is the U.S. national phase entry under 35 U.S.C. § 371 of International Application No. PCT/EP2017/068924, filed Jul. 26, 2017, entitled PRE-TREATMENT COATING COMPOSITION AND A METHOD FOR PRODUCING THE SAME, which in turn claims priority to and benefit of Great Britain Application No. 1612960.3, filed Jul. 27, 2016; each of which is incorporated herein by reference in their entirety for all purposes.

TECHNICAL FIELD OF THE INVENTION

The present invention relates to a pre-treatment coating composition comprising functionalised graphene and to a method for producing the same. The invention also relates to a coated metal substrate comprising the pre-treatment coating composition and to the use of the pre-treatment coating composition for protecting a metal or metal alloy substrate.

BACKGROUND TO THE INVENTION

An anti-corrosion pretreatment coating is often applied to metal substrates, especially metal substrates that contain iron such as steel, prior to the application of a protective or decorative coating. The pretreatment coating minimizes the amount of corrosion to the metal substrate, if and when, the metal substrate is exposed to moisture and oxygen.

Many of the present pretreatment coatings are based on metal phosphates and chromates and are obtained from phosphating and chromating treatments respectively.

Phosphating is a treatment in which a metal substrate is immersed or sprayed with a dilute solution of phosphoric acid and phosphate salts to form a substantially insoluble phosphate coating at the metal surface. Phosphating is typically used to protect iron, mild steel, galvanised steel, zinc and aluminium surfaces from corrosion.

Chromating typically involves immersing metal strips or sheets in a chromic acid solution to form a conversion coating on the metal surface. The conversion coating is typically yellowish in colour and exhibits chemical and physical properties that differ from the metal substrate which enables the metal substrate to be protected from corrosion. Chromate pre-treatment coatings are normally used to protect mild steel, light alloys and galvanized surfaces.

The mechanism of corrosion protection for a chromated metal substrate is set out hereunder:

Metal dissolves to produce metal ions and electrons at the anodic site:

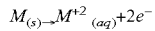

$$M_{(s)} \rightarrow M^{+2}_{(aq)} + 2e^-$$

At the cathodic site, oxygen and water react with the electrons to produce hydroxyl ions:

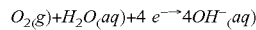

$$O_2(g) + H_2O(aq) + 4\ e^- \rightarrow 4OH^-_{(aq)}$$

The metal ions react with chromate ions to produce a metal chromate corrosion inhibiting layer at the anode:

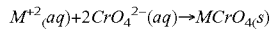

$$M^{+2}(aq) + 2CrO_4^{2-}(aq) \rightarrow MCrO_{4(s)}$$

Alternatively, hexavalent chromium, when reduced to $Cr^{+3}$, can inhibit the cathodic corrosion process:

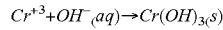

$$Cr^{+3} + OH^-(aq) \rightarrow Cr(OH)_{3(s)}$$

The fact that hexavalent chromium (Cr(VI)) is able to provide both cathodic and anodic corrosion inhibition accounts for the wide use of chromate-based pre-treatment coatings. However, a known drawback is that Cr (VI) is carcinogenic and toxic making it dangerous to human health and the environment. REACH legislations in the European Union have called for a ban on the use of Cr (VI).

In light of this, considerable effort has been made to develop Cr (VI)—free coating systems. The use of phosphate solutions was an immediate alternative but the requirement for acidic conditions for successful implementation proved to be a major roadblock as a viable alternative.

Although Cr(III) based coatings have begun to gain prominence and represent an environment friendly alternative to Cr (VI) based coatings, up until now the corrosion performance of Cr (III) based coatings relative their Cr(VI) counterparts to date has been inferior.

Zirconia and titanium based coatings, which form complex fluoro-based compounds, have shown a satisfactory performance compared to Cr (VI) based pre-treatments under accelerated corrosive conditions but the use of fluoro-based compounds is also a major area of concern from a health and environmental perspective.

Sol-gel protective coatings have demonstrated excellent chemical stability and enhanced corrosion resistance for metal substrates but unfortunately face challenges on pot life time and durability.

In recent years work has focussed on incorporating graphene, a one-atom or few-layer thick sheet of crystalline graphite, into corrosion protective coatings due its excellent chemical resistance, mechanical strength and impermeability to gases and corrosive ions. Despite the benefits of graphene and its potential to improve the corrosion performance of corrosion protective coatings beyond that of conventional coating systems, there is no known method that facilitates large scale bulk production of graphene. This in turn increases the manufacturing cost of producing corrosion protective compositions and coatings comprising graphene thereby reducing the commercial viability of producing corrosion protective compositions incorporating graphene in large quantities.

Technologies for the production of graphene may be divided into two broad categories, "bottom-up" or "top-down", each of which include a range of specific production methodologies. However, these methods require high purity graphite or highly prepared carbon materials as feedstock for graphene production processes, all of which increases the cost of graphene.

Bottom-up methods mean that graphene is made (grown) using carbon molecules typically from a pure hydrocarbon source. Graphene is assembled atom by atom. Thin graphene films (few layer graphene or FLG) are precipitated onto a substrate which ensures very few layers and low defect films. However, the key is the ability to remove the graphene film from the substrate for its ultimate application without damaging it. The high temperature and pressure, complex equipment and handling complications required to grow graphene makes this a very high cost approach. Specific bottom-up methods include chemical vapour deposition (CVD), growth on Silicon Carbide (epitaxial growth), growth on metals through precipitation, molecular beam epitaxy, and chemical synthesis using benzene as the building block.

The top-down methods include those methods in which graphene that already exists is liberated from its host, e.g. graphite mineral concentrate or synthetic graphite (highly ordered pyrolytic graphite—HOPG). There are many processes that rely on natural or synthetic graphite as the graphene's precursor material. These methods predominantly produce flakes (nano-platelets) of graphene of variable thickness (i.e. you may for example see a bell curve where there exists a small percentage of single layer material, a predominance of few layered flakes and then a percentage of many layered materials which, depending on the desired end use, could be deemed to be graphite (>10 or 20 layers)). Specific top-down processes include mechanical or micro-mechanical exfoliation/cleavage, sonication, laser ablation and photoexfoliation, anionic bonding techniques, and electrochemical/electrolytic exfoliation.

A variety of electrochemical/electrolytic techniques for the exfoliation of a variety of graphitic substances to produce graphene are known from the prior art. However, most of these are limited to laboratory scale methods and do not contemplate the production of commercial quantities of graphene. Significantly, all the current processes require a feedstock of purified natural concentrate or synthetic graphite which, as discussed above, increases the cost of graphene production and in turn the cost of any coating composition comprising graphene.

In light of the above it is an object of embodiments of the present invention to provide a method which enables graphene to be produced in commercial quantities.

It is another object of the present invention to provide a commercially viable method for producing pre-treatment coating compositions that comprise graphene.

It is also an object of embodiments of the invention to provide a Cr (VI)—free pre-treatment coating which exhibits comparable or better corrosion protection performance to that of conventional chromate and phosphate based pre-treatment coatings.

It is also an object of embodiments of the invention to provide a Cr (VI)—free pre-treatment coating that is less dangerous to human health and the environment.

SUMMARY OF THE INVENTION

According to a first aspect of the invention there is provided a method for producing a pre-treatment coating composition for a metal substrate, the method comprising the steps of:
  i. Mining graphite ore from a graphite ore body;
  ii. subjecting the graphite ore to an electrolytic treatment to obtain an expanded graphitic material;
  iii. subjecting the expanded graphitic material to an exfoliation treatment to obtain single-layer graphene and few-layer graphene, and
  iv. functionalising the graphene with a coupling agent for coupling graphene to the metal substrate.

By subjecting the graphite ore to an electrolytic treatment large volumes of the expanded graphitic material can be obtained easily and in a commercially viable manner for the production of single-layer graphene and few-layer graphene for use in corrosion protective coatings. In the context of the present invention the term "few-layer" graphene may be defined as graphene that is 2 to 10 layers thick.

Advantageously, the use of mined graphite material in the electrolytic production of graphene presents significant advantages over conventional processes for producing graphene. In this regard the precursor material that forms the electrode in the electrolytic treatment is provided direct from the ground, rather than being a highly purified, processed and expensive natural feedstock or a synthetic feedstock. This provides a significant advantage in terms of reduced capital expenditure compared to prior art processes and competing methods of graphene production. Further, the graphitic material obtained from the electrolytic treatment is in an expanded form in that it exhibits increased interlayer spacing between adjacent graphitic layers relative to graphite that is produced using conventional methods. This weakens the bonds between adjacent graphitic layers and promotes exfoliation of the expanded graphitic material into graphene such that greater yields of single-layer graphene and few-layer graphene can be obtained. This in turn means that greater quantities of graphene can be functionalised during the functionalisation step so that increased amounts of graphene are incorporated into a pre-treatment coating. Accordingly, it has been found that pre-treatment coatings formed from the pre-treatment coating composition obtained in accordance with the method of the first aspect of the invention exhibit excellent corrosion protection properties and that they perform better than chromated steel, galvanised steel, stainless steel and aluminium substrates.

The graphene obtained from the method of first aspect of the invention can be pristine graphene that is free from oxides. It should be understood that this does not include graphene that has been reduced from graphene oxide since it is known that some graphene oxide remains after the reduction step. When oxide-free graphene is used, the coupling agent is able to react with free electrons located at the graphene edges to form functionalised graphene. By using oxide-free graphene rather than graphene oxide (GO) or reduced graphene oxide (RGO), further improvements in corrosion resistance and in the mechanical properties of the coatings thus formed can be obtained. The reduced corrosion resistance and mechanical properties that are observed when coatings comprise GO or RGO has been attributed to the presence of oxides which act as defects that are detrimental to the physical properties of the pre-treatment coating. Preferably the mined graphite is obtained from the graphite body using non-explosive techniques such as cutting, sawing or slicing using a wire. Preferably the graphite is obtained as whole ore blocks. Advantageously, the graphite ore may be cut, sawn or sliced to a size and shape that is able to be used without further size reduction in the electrolytic process for the production of the expanded graphitic material. Further, the graphite ore is sufficiently conductive and strong that it can be used directly as an electrode in the electrolytic treatment for the production of the expanded graphitic material though electrolytic exfoliation.

Preferably, the graphitic material comprises nano-micro platelet graphite. It is understood that the nano-micro platelet graphite obtained from the electrolytic treatment does not substantially exhibit the folding or rounding of platelet edges that are typically exhibited when graphite materials are exposed to mechanical exfoliation or other size reduction processes, for example most milling and comminution processes. The nano-micro platelet graphite is also understood to combine the features of a high aspect ratio, relatively natural edges and a high surface area, all of which make the nano-micro platelet graphite of the present invention very suitable for functionalisation with an appropriate coupling agent.

The electrolytic treatment may be carried out in the presence of an electrolyte containing ammonium cations. The electrolyte may additionally comprise sulphur-containing anions and in preferred embodiments the electrolyte comprises ammonium sulphate since such salts are less corrosive and dangerous than other commonly used electrolytes such as sulfuric acid and N-methyl-2-pyrrolidone. The pH of the electrolyte is preferably between 6.0 and 8.5 since increased yields of the expanded graphitic material can be obtained.

When the electrolyte contains sulphur-containing anions such as sulphate, it is preferable to separate these from the expanded graphitic material since the presence of sulphur-containing anions were found to be detrimental to coating corrosion performance.

Preferably a liquid-liquid separation (LLS) route is employed to separate the sulphate anions from the graphitic material which involves mixing the graphitic material with a liquid that is immiscible with water. The sulphur-containing anions should be more soluble in the immiscible liquid than in water to enable extraction of the sulphur-containing anions from the graphitic material. In a preferred embodiment the immiscible liquid comprises an organic solvent such as kerosene. Kerosene is preferred due to its higher flash point and low cost compared to other conventionally used organic solvents such as hexane.

By subjecting the expanded graphitic material to a liquid-liquid beneficiation treatment the gangue materials can removed and the carbon content can be increased from 10-30% present in the ore to 80-99% carbon by weight.

The exfoliation treatment may comprise the step of subjecting the graphitic material to a chemical treatment. The chemical treatment preferably comprises an intercalation step where the graphitic material is mixed with a solution containing an intercalation agent.

In preferred embodiments the solution comprises 0.5-7 wt. %, preferably 0.5-2 wt. % of the intercalation agent.

Preferably the intercalation agent comprises quaternary ammonium ions. The intercalation of quaternary ammonium ions was found to be particularly suitable for increasing the distance between graphitic interlayers. This weakens the forces that hold the graphitic layers together which enables increased amounts of single layer-graphene and few-layer graphene to be obtained following the exfoliation treatment.

Preferably the intercalation agent comprises a quaternary ammonium salt, more preferably tetrabutyl ammonium sulphate.

The solution comprising the intercalation agent may additionally comprise one or more surfactants. By providing a solution containing intercalating agents and surfactants it has been possible to increase the exfoliation yield of graphene by 20-40% relative to the exfoliation yield of graphene that was obtained from a solution containing intercalating agents but no surfactants.

The solution may comprises up 10 wt. % of surfactant. Preferably the solution comprises 1.0-6.0 wt. % of surfactant, more preferably the solution comprises 1.0-4.0 wt. % of surfactant.

The exfoliation treatment preferably comprises a combined chemical and high pressure treatment. Preferably, the chemically treated graphitic material is additionally subjected to a high pressure treatment between 200 and 5000 bar, more preferably the high pressure treatment is carried out at a pressure of at least 1200 bar. By subjecting the graphitic material to the chemical treatment and a high pressure treatment increased yields of single-layer and few-layer graphene can be obtained.

Alternatively, the exfoliation treatment may comprise a combined chemical treatment and mechanical treatment. In this embodiment the graphitic intercalated compound obtained from the chemical treatment may be subjected to one or more mechanical treatments. Preferred mechanical treatments include ultrasonic agitation, an airless spray treatment and a high shear mixer exfoliation treatment.

Following exfoliation, the method may comprise an additional step of separating single-layer graphene and few-layer graphene from any residual expanded graphitic material, preferably by centrifuge.

The coupling agent preferably comprises an organo-functional siloxane that is capable of reacting with graphene and reactive species on the surface of the metallic substrate. The use of organo-functional siloxanes enables graphene to form a strong chemical bond with metal substrate and facilitates the formation of a dense graphene 3-dimensional network throughout the coating matrix by self-assembly.

The coupling agent may comprise an amino siloxane or a siloxane oligomer that comprises one or more organo-functional groups selected from monoamines, diamines, aminoalkyls and alkyls. The aminoalkyls and alkyl groups may comprise linear, branched or cyclic alkyl groups of 1 to 18 carbon atoms.

Examples of suitable siloxane-based coupling agents that may be used in accordance with the present invention include (3-amino-propyltriethoxysilane, 3-aminopropylmethyldiethoxysilane, Poly[dimethylsiloxane-co-(3-aminopropyl)methylsiloxane], Poly(dimethylsiloxane), bis(3-aminopropyl) terminated, Dynasylan® HYDROSIL 2627, Dynasylan® HYDROSIL 2909, Dynasylan® Sivo110, Dynasylan® Sivo113, Dynasylan® Sivo121).

The coupling agent may comprise at least a first organo-functional siloxane oligomer and a second organofunctional siloxane oligomer. Preferably the first siloxane oligomer comprises one or organofunctional groups selected from monoamines, diamines, amino-alkyls and alkyls.

The organofunctional groups of the second siloxane oligomer are preferably capable of reacting with the organo-functional groups of the first oligomer. In a preferred embodiment the organofunctional groups of the second siloxane oligomer may be selected from monoamines, diamines, amino-alkyls, alkyls, epoxies and hydroxyls.

In a preferred embodiment the ratio of the first organo-functional siloxane oligomer to the second organofunctional oligomer is between 1.2:1 to 1.8:1. It was found that very good corrosion protection could be obtained when the coating comprised the first and second organofunctional oligomers in a ratio falling within the aforementioned range.

When the metallic substrate comprises mild steel or galvanised steel the organo-functional siloxane is preferably hydrolysed at an acidic pH prior to the step of functionalising graphene. For instance, it is preferable to hydrolyse the organosiloxane at a pH of 4.0 to 6.0. More preferably the organosiloxane is hydrolysed at a pH of 4.5 to 5.5. If the organosiloxane is hydrolysed at an alkaline pH or at a pH falling outside of the above pH ranges then this could result in reduced adhesion between the mild steel or galvanised steel substrate and the functionalised graphene based coating.

When the pre-coating composition is to be applied onto stainless steel then it is preferable to hydrolyse the organosiloxane at neutral pH.

If the pre-treatment coating composition is for use with aluminium it is preferable to hydrolyse the organosiloxane at a pH of 5.5 to 9 or more preferably at a pH of 7.5 to 8.5.

If the pre-treatment coating composition is for use with copper then it is preferable to hydrolyse the organosiloxane at a pH of 7 to 12 or more preferably at a pH of 7.5 to 8.5.

If on the other hand the pre-treatment coating composition is for use with a magnesium substrate then a solution pH of 11.5 to 14 is preferred. More preferably the pH is from to 11.5 to 13.5.

It has been found that the functionalised graphene coating may exhibit reduced adhesion towards the aluminium, magnesium or copper substrates if the pH of the solution falls outside of the above-mentioned ranges.

According to a second aspect of the invention there is a provided a pre-treatment coating composition produced according to the method of any one of the preceding claims. The pre-treatment coating composition according to the second aspect of the invention may incorporate any or all of the features described in relation to the first aspect of the invention as appropriate.

According to a third aspect of the invention there is provided a metallic substrate provided with a pre-treatment coating, wherein the pre-treatment coating is formed from the pre-treatment coating composition produced according to the method of the first aspect of the invention or the pre-treatment coating composition of the second aspect of the invention. Accordingly, the pre-treatment coating may contain any or all of the features described in relation to the first aspect of the invention or in relation to the second aspect of the invention.

The metallic substrate provided with the pre-treatment coating may be prepared by a method comprising the steps of:
i. mining graphite ore from a graphite ore body;
ii. subjecting the graphite ore to an electrolytic treatment to obtain an expanded graphitic material;
iii. subjecting the expanded graphitic material to an exfoliation treatment to obtain single-layer graphene and few-layer graphene;
iv. functionalising the graphene with a coupling agent for coupling graphene to the metal substrate;
v. applying the pre-treatment composition comprising functionalised graphene on the metal substrate, and
vi. subjecting the coated metal substrate to a heat treatment to form the pre-treatment coating.

The pre-treatment coating preferably has a thickness of 0.5-5.0 microns. If the coating thickness is below 0.5 microns then the pre-treatment coating may not possess the required corrosion protection properties. On the other hand, if the pre-treatment coating has a dry film thickness of greater than 5 microns then the pre-treatment coating may have an increased tendency to delaminate from the metallic substrate. In one embodiment of the invention the pre-treatment coating may have a coating thickness of 1-3 microns.

The metallic substrate may be a metal such as aluminium or magnesium or a metal alloy such as mild steel. Alternatively, the metallic substrate could be a galvanised steel substrate.

According to a fourth aspect of the invention there is provided a use of the pre-treatment coating composition produced in accordance with the first aspect of the invention or of the pre-treatment coating composition of the second aspect of the invention for protecting a metal or metal alloy substrate from corrosion. Accordingly, the pre-treatment coating composition may contain any or all of the features described in relation to the first or second aspects of the invention.

DETAILED DESCRIPTION OF THE INVENTION

In order that the invention may be more clearly understood embodiments thereof will now be described, by way of example only.

FIG. 1 shows the results of an electrolytic impendence spectroscopy experiment for bare mild steel, mild steel provided with an organosiloxane coating and mild steel provided with the single-layer and few-layer graphene functionalised pre-treatment coating of the invention.

Figure 2:
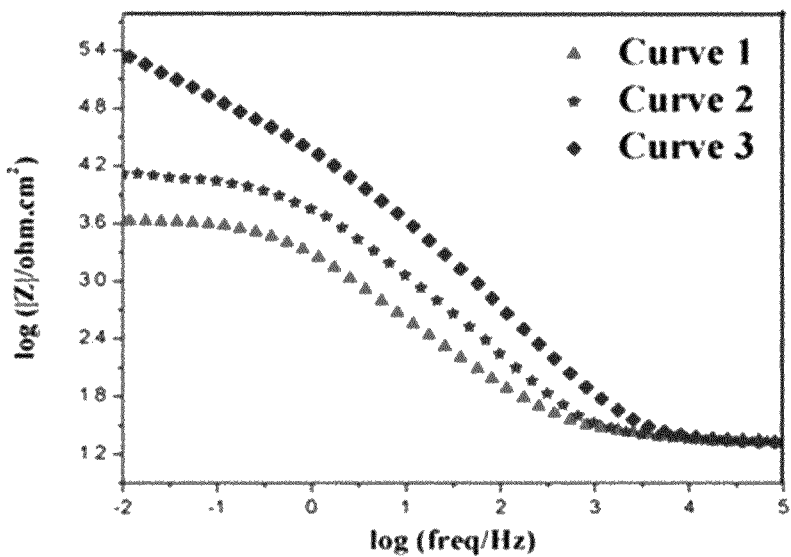

FIG. 2 shows the results of an electrolytic impendence spectroscopy experiment for bare galvanised steel, galvanised steel provided with an organosiloxane coating and galvanised steel provided with the single-layer and few-layer graphene functionalised the pre-treatment coating of the invention A suitable graphite material "Vittangi graphite", being a strong, conductive graphite bearing ore, was identified and is available to the Applicant in the Nunasvaara deposit in Sweden, being a predominantly microcrystalline flake Joint Ore Reserves Committee (JORC 2012) mineral resource of 9.8 Mt at 25.3% graphite (Cg). Grades for this deposit have been drill tested at an average of 26.2% Cg, with grades attaining up to 46.7% Cg. The rock strength has been measured at approximately 120 MPa and the resistivity at less than 10 Ohm-meter, for example 0.0567 Ohm-meter. A graphite deposit of the nature of the Nunasvaara deposit in Sweden would not be, and has not been to date, considered an appropriate source of graphitic material feedstock for the production of graphene. Graphite bearing ore obtained from the Nybrännan deposit as part of the Jalkunen Project is also a suitable material that is available to the Applicant for the production of graphene.

The graphite ore is extracted by known quarry mining methods with abrasive disks, saws or wires and other known non-explosive methods of rock extraction in an ore extraction step. The blocks of ore obtained have sizes which are suitable for transport, transfer movement, and handing. The blocks may be further cut into smaller shapes or forms of electrodes which are considered more suitable for presentation to an electrolytic process. The blocks may be cubic, cylindrical, trapezoidal, conical, or rectangular in shape and have a preferred minimum dimension of 50 mm and maximum dimension of 2000 mm. More particularly, the blocks have a minimum dimension of 100 mm and maximum dimension of 1000 mm, or still more particularly a minimum dimension of 150 mm and maximum dimension of 500 mm.

The ore blocks from the graphitic deposit are employed directly as electrodes in electrolysis for the production of nano-micro platelet graphite. In this embodiment the extracted graphite ore is used as the anode, copper metal is used as the cathode and the electrolytic treatment is carried out in the presence of a 1M ammonium sulphate solution having a pH of 6.5. The voltage applied to exfoliate the extracted graphite into nano-micro platelet graphite was 10V and the ammonium sulphate solution was concurrently stirred at 1000 rpm.

The nano-micro platelet graphite obtained after the electrolytic treatment has substantially unaltered properties relative to the graphite ore from which it is produced. Moreover, the obtained nano-micro platelet graphite exhibited increased interlayer spacing between adjacent graphitic sheets relative to the observed interlayer spacing of nano-micro platelet graphite obtained from synthetic graphite or highly ordered pyrolytic graphite (HOPG).

Following the electrolytic treatment and before further exfoliation of the nano-micro platelet graphite into graphene, sulphate anions were separated from the solution containing the nano-micro platelet graphite. This was achieved by subjecting the solution containing the nano-micro platelet graphite to a liquid-liquid separation treatment in which the solution was added to kerosene. Since sulphate anions are more soluble in kerosene than in water they readily migrate and are solubilised into the organic solvent, which facilitates their removal from the solution containing the nano-micro platelet graphite. The nano-micro platelet graphite obtained following this beneficiation treatment comprises 80-99% by weight of carbon.

To obtain single-layer graphene and few-layer graphene layer, the nano-micro platelet graphite obtained from the beneficiation treatment was subjected to a combined chemical and high pressure exfoliation treatment. The chemical treatment involves mixing the nano-micro platelet graphite (100 g) with an aqueous ammonium tetrabutyl ammonium sulphate solution (0.5 wt. %) to intercalate ammonium ions between the graphitic layers of the nano-micro platelet graphite. It will be appreciated that an ammonium persulphate solution (0.5 wt. %) could be used instead of the ammonium sulphate solution. The aqueous ammonium sulphate solution additionally comprises Antiterra 250 (1 wt. %) and DISPERBYK 2012 (2 wt. %) both of which are manufactured by BYK. This solution is then kept at room temperature and pressure for a period of 7 days to increase the content of intercalated ammonium ions between the graphitic layers.

As discussed above, subjecting the graphite ore to an electrolytic treatment enables nano-micro platelet graphite with increased interlayer spacing to be obtained. This in turn aids intercalation of the nano-micro platelet graphite and weakens the bond strength between adjacent graphitic layers.

The solution containing the intercalated nano-micro platelet graphite and surfactants is then subjected to the high pressure treatment in an M-110Y high pressure pneumatic homogenizer which involves the use of a high pressure jet channel in an interaction mixing chamber. The solution containing intercalated nano-micro platelet graphite and surfactants is pumped from opposite sides of the homogeniser into the mixing chamber. This causes two highly accelerated liquid dispersion streams to collide with pressurised gas (1200 bar), resulting in de-agglomeration of the graphitic layers and the exfoliation of single-layer and few-layer graphene in high yield.

The combination of high pressure and reduced bond strength between adjacent graphitic layers of the nano-micro platelet graphite increases the amount of single-layer graphene and few-layer graphene that is formed relative to graphene that is exfoliated from graphite using a high sheer exfoliation route. Advantageously, it has been found that by following the method of the present invention the graphene yield could be increased by 20-40% relative to the graphene yields obtained when using conventional high shear treatments to exfoliate graphene from graphite.

Following the combined chemical and high pressure exfoliation treatment the solution obtained is ultra-centrifuged at 5000-10,000 rpm for 60 minutes using a Fisher scientific Lynx 4000 centrifuge in order to substantially separate the exfoliated graphene from any residual nano-micro platelet graphite. This is important since it has been found that pre-treatment coatings that contain multi-layer graphene (more than 10 graphene layers) have been found to reduce the corrosion protective properties of the pre-treatment coating.

To provide a pre-treatment coating composition for mild steel an aqueous solution of exfoliated graphene and surfactants (5% w/w) having a neutral pH was provided in a first step. Dynasylan Hydrosil 2627 (100 ml) and 3-Aminopropyl triethoxysilane or "APTES" (50 ml) were then individually hydrolysed for 10 hours using acetic acid acidified water (150 ml) to obtain a solution of pH 4-5. The amino group based hydrolysed siloxane (Dynasylan Hydrosil 2627) solution was maintained at 25° C. and then mixed for 2 hours with the pH neutral exfoliated graphene solution (5% w/w) in order to obtain functionalized graphene. The hydrolyzed APTES solution was then added to the amino siloxane functionalized graphene solution and the pH adjusted to pH 4-5 by adding a few drops of concentrated acetic acid. Viscosity modifiers (such as Borchigel L75N or Ethoxy ethyl cellulose) and BYK additives (such as BYK378 or 348) were subsequently added (less than 1%) to adjust the solids content of the functionalized graphene solution.

This solution was then applied onto a pre-cleaned mild steel substrate by bar coating to simulate a roll to roll coating process. The applied coating was then cured at 150° C. for 60 seconds.

To provide a pre-treatment coating composition for galvanised steel an aqueous solution of exfoliated graphene and surfactants (5% w/w) having a neutral pH was provided in a first step. Dynasylan Hydrosil 2627 (100 ml) and Dynasylan Hydrosil 2609 (50 ml) were then individually hydrolysed for 10 hours using acetic acid acidified water (150 ml) to obtain a solution of pH 4-5. The amino group based hydrolysed siloxane (Dynasylan Hydrosil 2627) solution was maintained at 25° C. and then mixed for 2 hours with the pH neutral exfoliated graphene solution (5% w/w) in order to obtain functionalized graphene. The hydrolysed Dynasylan Hydrosil 2609 solution was then added to the amino siloxane functionalized graphene solution and the pH adjusted to pH 4-5 by adding a few drops of concentrated acetic acid. Viscosity modifiers (such as Borchigel L75N or Ethoxy ethyl cellulose) and BYK additives (such as BYK378 or 348) were subsequently added (less than 1%) to adjust the solids content of the functionalized graphene solution.

This solution was then applied onto a pre-cleaned galvanised steel substrate by bar coating to simulate a roll to roll coating process. The applied coating was then cured at 150° C. for 60 seconds.

In order to investigate the corrosion protective properties of the pre-treatment coating compositions of the invention, the coated mild steel and galvanised steel substrates were analysed by electrochemical impendence spectroscopy (EIS) and by a liner polarization technique using a potentiostat (Biologic SP300). The procedure outlined in ASTM G3-14 was followed.

EIS was used to analyse the barrier properties of the pre-treatment coating of the invention, whereas linear polarisation was used to determine the corrosion rate. As controls, EIS and linear polarisation experiments were also conducted on bare mild steel and galvanised steel substrates as well as on Dynasylan® Hydrosil 2627/APTES coated mild steel substrates and Dynasylan® Hydrosil 2627/Dynasylan Hydrosil 2609 coated galvanised steel substrates. The dry film thickness of the coatings on the respective substrates was 1 micron.

The results of the EIS experiments are shown in FIGS. 1 and 2. A high impendence value (y-axis) is indicative of good barrier properties.

FIG. 1 shows the results of an electrolytic impendence spectroscopy experiment for bare mild steel, Dynasylan® Hydrosil 2627/APTES coated mild steel and mild steel provided with the Dynasylan® Hydrosil 2627/APTES-functionalised graphene coating. It can be seen that an impendence value of around 3.3 is obtained for the uncoated mild steel substrate (curve 1), that an impendence value of around 4.0 is obtained for the Dynasylan® Hydrosil 2627/APTES coated mild steel substrate (curve 2) and the an impendence value of around 4.8 is obtained for the mild steel provided with the Dynasylan® Hydrosil 2627/APTES-functionalised graphene coating (curve 3). Accordingly, the results show that the best barrier protection properties are obtained when mild steel is coated with Dynasylan® Hydrosil 2627/APTES-functionalised graphene.

FIG. 2 shows the results of an EIS experiment for bare galvanised steel, Dynasylan® Hydrosil 2627/Dynasylan Hydrosil 2609 coated galvanised steel and galvanised steel provided with the Dynasylan® Hydrosil 2627/Dynasylan Hydrosil 2609-functionalised graphene coating. It can be seen that an impendence value of around 3.6 is obtained for the uncoated galvanised steel substrate (curve 1), that an impendence value of around 4.1 is obtained for the Dynasylan® Hydrosil 2627/Dynasylan Hydrosil 2609 coated galvanised steel substrate (curve 2) and the an impendence value of around 5.4 is obtained for the galvanised steel provided with the Dynasylan® Hydrosil 2627/Dynasylan Hydrosil 2609 graphene coating (curve 3). Thus, the results show that for galvanised steel substrates, the best barrier protection properties are obtained when the galvanised steel substrate is coated with a composition that comprises Dynasylan® Hydrosil 2627/Dynasylan Hydrosil 2609-functionalised graphene.

The EIS results additionally show that the galvanised substrates provided with Dynasylan® Hydrosil 2627/Dynasylan Hydrosil 2609-functionalised graphene coatings exhibit better corrosion protection properties that their mild steel counterparts that were provided with a Dynasylan® Hydrosil 2627/APTES-functionalised graphene coating. This has been attributed, at least in part, to the additional corrosion protection afforded by the galvanised coating layer.

The results of the linear polarisation experiments for mild steel and galvanised steel coated substrates are given in Table 1 and Table 2 respectively.

Table 1 shows that the rate of corrosion for the Dynasylan® Hydrosil 2627/APTES coated mild steel substrate ($1.19 \times 10^{-3}$) is much lower than the rate of corrosion that was obtained for the corresponding uncoated mild steel substrate ($5.79 \times 10^{-1}$). Table 1 also shows that the rate of corrosion can be reduced still further by providing the mild steel substrate with a coating that comprises Dynasylan® Hydrosil 2627/APTES-functionalised graphene ($9.06 \times 10^{-5}$).

TABLE 1

| Sample | $I_{corr}$ mA/cm$^2$ | CR (mm/year) |
|---|---|---|
| Mild steel | 51.2 | $5.79 \times 10^{-1}$ |
| Dynasylan ® Hydrosil 2627/APTES coated mild steel | 0.1047 | $1.19 \times 10^{-3}$ |
| Dynasylan ® Hydrosil 2627/APTES - functionalised graphene coated mild steel | 0.008 | $9.06 \times 10^{-5}$ |
| Dynasylan ® Hydrosil 2627/APTES - functionalised GO coated mild steel | 0.01 | $1.11 \times 10^{-4}$ |
| Dynasylan ® Hydrosil 2627/APTES - functionalised RGO coated mild steel | 0.04 | $4.50 \times 10^{-4}$ |

Similarly, Table 2 shows that the rate of corrosion for the Dynasylan® Hydrosil 2627/Dynasylan Hydrosil 2609 coated galvanised steel was much lower than the galvanised steel control but not as high as the Dynasylan® Hydrosil 2627/Dynasylan Hydrosil 2609-functionalised graphene coated galvanised steel substrate. This again indicates that the incorporation of graphene that was obtained in accordance with the method of the present invention has a beneficial effect in terms of reducing the rate of corrosion.

TABLE 2

| Sample | $I_{corr}$ mA/cm$^2$ | CR (mm/year) |
|---|---|---|
| Galvanised steel | 0.0436 | $6.54 \times 10^{-3}$ |
| Dynasylan ® Hydrosil 2627/Dynasylan Hydrosil 2609coated galvanised steel | 0.00631 | $9.00 \times 10^{-5}$ |
| Dynasylan ® Hydrosil 2627/Dynasylan Hydrosil 2609-functionalised graphene coated galvanised steel | 0.000955 | $1.43 \times 10^{-5}$ |
| Dynasylan ® Hydrosil 2627/Dynasylan Hydrosil 2609-functionalised GO coated galvanised steel | 0.00567 | $8.1 \times 10^{-5}$ |
| Dynasylan ® Hydrosil 2627/Dynasylan Hydrosil 2609-functionalised RGO coated galvanised steel | 0.00375 | $5.35 \times 10^{-5}$ |

Table 1 and Table 2 additionally show that mild steel and galvanised steel substrates that comprise RGO or GO Dynasylan® Hydrosil 2627/APTES-functionalised graphene coatings exhibit an increased rate of corrosion relative to substrates provided with Dynasylan® Hydrosil 2627/APTES-functionalised graphene coatings obtained in accordance with the method of the present invention. The observed increase in the rate of corrosion has been attributed to the presence of oxides which act as defects in the coating matrix.

The above embodiments are described by way of example only. Many variations are possible without departing from the scope of the invention as defined in the appended claims.

The invention claimed is:

1. A method for producing a pre-treatment coating composition for a metal substrate, the method comprising the steps of:
   i. subjecting a graphite ore to an electrolytic treatment to obtain an expanded graphitic material;
   ii. subjecting the expanded graphitic material to an exfoliation treatment to obtain single-layer graphene and few-layer graphene, wherein the exfoliation treatment is a combined chemical and high-pressure treatment comprising intercalating the graphitic material with an intercalating agent and a surfactant in an intercalation step and subjecting the intercalated graphitic material to a high-pressure homogenisation treatment;
   iii. separating graphene obtained from the exfoliation treatment from any residual graphitic material; and
   iv. functionalising the graphene with a coupling agent for coupling graphene to the metal substrate;
   wherein the electrolytic treatment is carried out in the presence of an electrolyte that comprises ammonium ions and sulphur-containing ions and the sulphur-containing ions are separated from the expanded graphitic material by mixing the expanded graphitic material with a liquid that is immiscible with water.

2. Method according to claim 1, wherein the electrolyte has a pH between 6.0 and 8.5.

3. Method according to claim 1, wherein the immiscible liquid comprises kerosene.

4. Method according to claim 1, wherein the intercalation step comprises mixing the graphitic material with a solution containing 0.5-7 wt. % of the intercalation agent.

5. Method according to claim 4, wherein the intercalation agent comprises a quaternary ammonium salt or an ammonium persulfate salt.

6. Method according to claim 4, wherein the solution comprising the intercalation agent comprises up to 10 wt. % of the surfactant.

7. Method according to claim 1, wherein the high pressure homogenisation treatment is between 200 bar and 5000 bar.

8. Method according to claim 1, wherein the coupling agent comprises an organosiloxane.

9. Method according to claim 8, wherein the coupling agent comprises an amino siloxane or an amino alkyl siloxane.

10. Method according to claim 8, wherein the coupling agent comprises at least a first organosiloxane oligomer and a second organosiloxane oligomer.

11. Method according to claim 10, wherein the ratio of the first organosiloxane oligomer to the second organosiloxane oligomer is 1.2:1 to 1.8:1.

12. Method according to claim 8, wherein prior to the step of functionalising graphene, the organosiloxane is (i) hydrolysed at an acidic pH when the pre-treatment coating composition is for application onto mild steel or galvanised steel, or (ii) hydrolysed at a pH of 5.5 to 9.0 when the pre-treatment coating composition is for application onto aluminium, or (iii) hydrolysed at a pH of 7.0 to 12.0 when the pre-treatment coating composition is for application onto copper, or (iv) hydrolysed at a pH of 11.5 to 14.0 when the pre-treatment coating composition is for application onto magnesium, or (v) hydrolysed at neutral pH when the pre-treatment coating composition is for application onto stainless steel.

* * * * *